Feb. 9, 1965 W. H. GOODING 3,168,945
HOPPER STRUCTURE

Original Filed May 29, 1959 2 Sheets-Sheet 1

INVENTOR.
WILLARD H. GOODING
BY
EDWARD D. O'BRIAN
ATTORNEY

United States Patent Office 3,168,945
Patented Feb. 9, 1965

3,168,945
HOPPER STRUCTURE
Willard H. Gooding, Los Angeles, Calif., assignor to Western Velo & Cement Specialties Company, Los Angeles, Calif., a corporation of California
Original application May 29, 1959, Ser. No. 816,921, now Patent No. 3,085,674, dated Apr. 16, 1963. Divided and this application Feb. 13, 1963, Ser. No. 258,215
4 Claims. (Cl. 193—4)

This invention relates to new and improved unloading structures which are primarily intended to be used with granular materials such as sand, cement and the like. The invention more particularly pertains to the hopper structure intermediate a container being unloaded and an area into which the material is being moved. The particular materials for which this invention is especially adapted are those which can be harmed by the presence of moisture and those which can enter the atmosphere as dust. The hopper structure is particularly designed to prevent moisture and external contaminants from entering the material being moved through the hopper and to prevent the material in the hopper from entering the atmosphere.

The cost of transporting such materials from one location to another is a very important commercial factor at the present time. In general it is preferred to ship materials such as cement from one location to another by railroad because of cost considerations. However, several factors effectively limit the use of railroad transportation in the bulk movement of such materials.

One of these factors is the availability of railroad tracks in the desired location. However, this factor is not as important as the fact that many areas which have railroad tracks are such that dispersion of dust into the atmosphere becomes undesirable. Another factor is the economic cost of the permanent unloading structures. This limits the number which can be installed. Accordingly, transfer from rail to truck becomes limited in an area wide sense. Truck haulage from the location of unloading from the railroad becomes a longer distance situation. Longer trucking hauls are required than would be required if inexpensive unloading facilities were available.

Accordingly it is an object of this invention to provide new and improved unloading structures which are adapted to be economically installed in a larger number of locations. It is a more specific object of this invention to provide effective unloading structures which can move granular material such as cement without significant dust loss. Further objects and advantages of this invention will be apparent from study of the specification, claims and appended drawings in which:

The accompanying drawings are primarily intended to clearly illustrate a presently preferred embodiment of this invention. Those skilled in the art will find that the features of this invention are applicable to structures of somewhat different appearance. Such additional structures may be designed by route engineering skill from the advantages disclosed herein.

Figure 1:
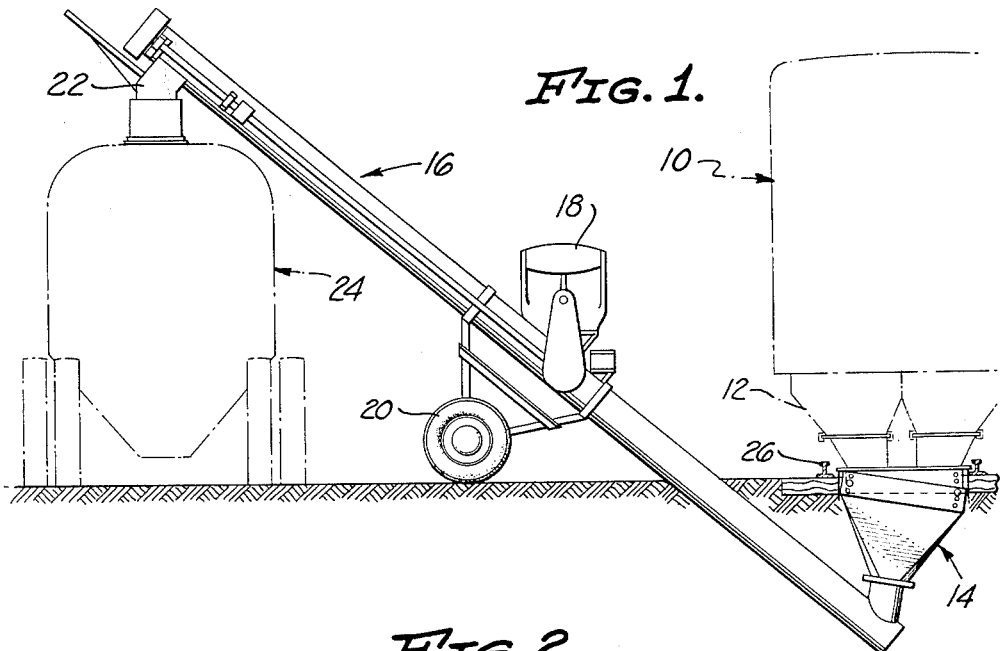
FIG. 1 is a side elevational view of the hopper structure of this invention showing its relationship to the railroad tracks, the railroad car, the conveyor means itself and the truck into which the material is being unloaded.

Referring now to the drawings, particularly FIG. 1, a railroad car 10 is shown. The railroad cars designed for transportation of these commodities normally have a sealed hoper design with a suitable roof having sealed covers suitable for the transportation of cement and the like. The railroad car discharges through its outlet hoppers 12 to the hopper 14 of this invention. The hopper discharges to a conveyor generally shown at 16. This conveyor may be of the screw type or any other suitable structure for the material being conveyed. The conveyor is powered by an engine 18 and is mounted on wheels 20 to make it easily movable. The conveyor 16 discharges through an outlet spout 22 to a suitable receptacle, in this case the truck 24.

It is obvious that the complete unloader can be employed for other purposes than the unloading of cement. Different sources than railroad car 10 may be employed and different receptacles than truck 24 may be suitable. Furthermore the limitation of material conveyed through the hopper 14 and conveyor 16 is a matter of design of these components. Suitable design would make them useful for a large number of different granular materials. Furthermore, several unloading structures can be used simultaneously should the vessel being unloaded and/or the vessel being loaded so indicate. By using several unloading structures it is apparent that it is possible to unload from a plurality of containers or to a plurality of containers, simultaneously, should loading conditions so indicate.

The unloader is formed so that the hopper structure 14 may be located within the space between two conventional railroad rails 26 and the space between two railroad ties, not shown, normally occupied by another full tie. This tie space may be unoccupied or may be occupied by a cut off tie 28. The cut off tie 28 provides space for reception of the hopper structure 14. This hopper structure 14 includes a top plate 30 designed to be held generally within the plane of the top surface of the cut off tie 28 by means of small angle iron brackets engaging upon the upper surfaces of the adjacent full ties. If desired, however, the brackets can be omitted and the plate 30 supported by other means, such as support on the cut off tie 28.

Figure 4:
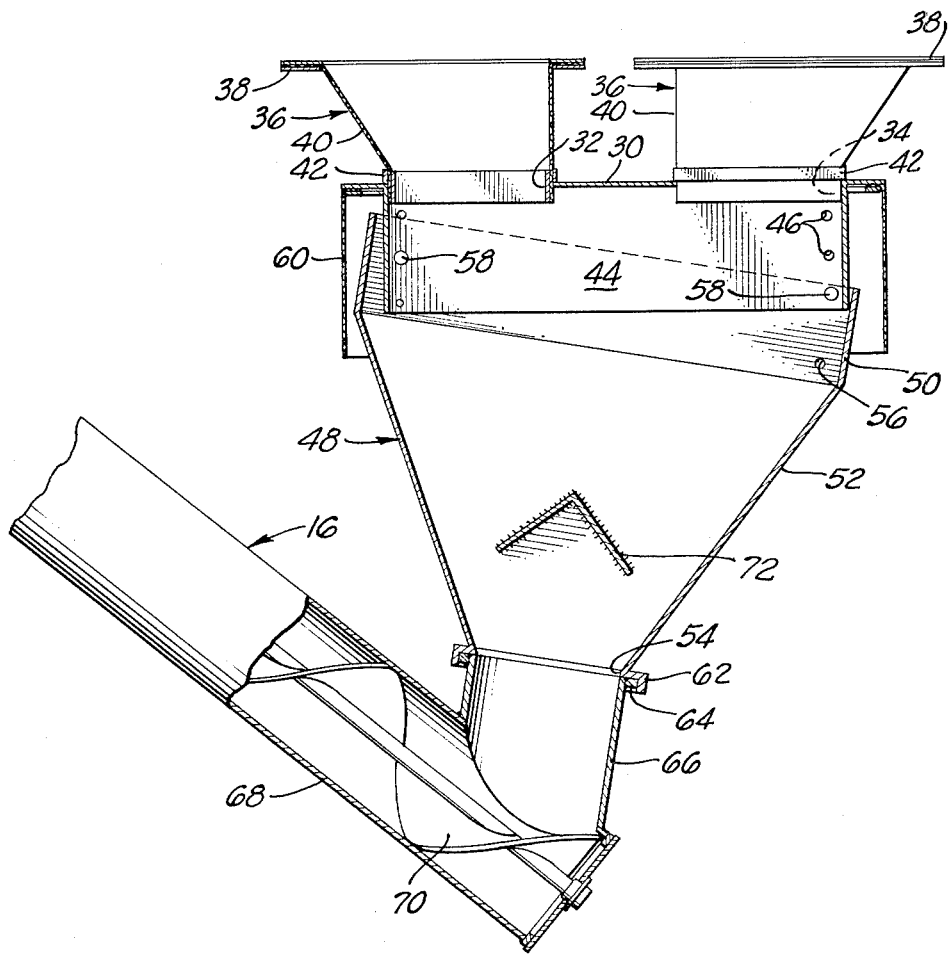
FIG. 4 is a partial vertical section through the hopper of this invention and a portion of the conveyor to which it is attached.

The plate 30 contains two openings 32 and 34 which are spaced apart from one another so as to be approximately aligned with the discharge openings of the railroad car 10, when the car is moved into proper position above the plate 30. Connectors 36 are provided to connect between the outlet hoppers 12 of car 10 and the openings 32 and 34. Preferably each of the connectors 36 includes a top metal flange 38, best shown in FIG. 4, adapted to be connected by conventional bolts or clamps, not shown, to the bottom of the hopper 12 on the railroad car 10.

The flanges 38 of the connectors 36 are secured to the tops of flexible chutes 40 which may be made out of waterproof canvas or various other flexible, preferably waterproof, materials. The bottoms of these chutes 40 are smaller than the tops of the chutes. Surrounding the chutes 40 near their bottom are metal rings 42 of substantially the same shape and dimension as the openings 32 and 34. These rings 42 are secured to the chutes 40 and are adapted to rest upon the plate 30 surrounding the openings 32 and 34, in order to firmly hold the connectors 36 in position with respect to the hopper structure 14 of this invention. Thus, an essentially water resistant seal is established.

An elongated dependent wall or skirt 44 is secured to the undersurface of the plate 30 so as to completely surround the openings 32 and 34. This skirt 44 adjacent to its ends, is provided with a series of aligned holes 46 which are adapted to be used in supporting a hopper section 48. Hopper section 48 includes a top wall 50 which is attached to the tapered wall 52 defining a hopper having a circular bottom outlet 54. The top wall 50 of the hopper section 48 is provided with a series of aligned holes 56 which are spaced so that their locations correspond to the locations of the holes 46.

Figure 2:
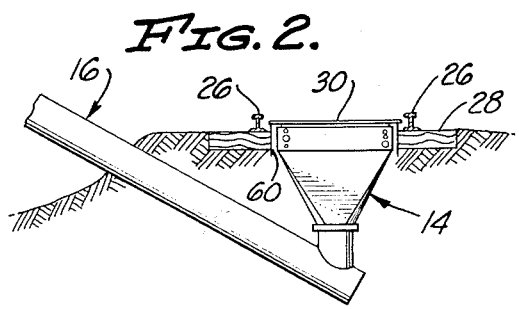
FIG. 2 is another side elevational view of the hopper structure showing it in a different position.
Figure 3:
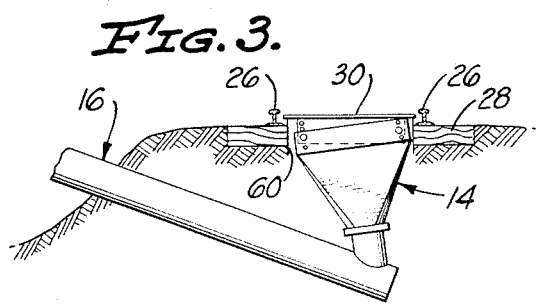
FIG. 3 is a further side elevational view of the hopper structure showing it in yet another position.

This construction permits the hopper section 48 to be suspended from the wall 44 in different manners as indicated in FIGURES 1, 2 and 3. The hopper 48 is maintained in these positions by means of pins 58 extending between holes 56 and holes 46, respectively in the top wall 50 and in the skirt 44. This feature of the invention is important for commercial reasons. It enables the unloader of this invention to be used where the elevation of the ground adjacent to a railroad track is either the same as or different from the elevation of the railroad track itself. Thus, the unloaders of the present invention can be used in virtually any location without reference to the grade level of the land. This is important where it is desired to use such unloaders in various locations where prior structures intended for this purpose could not be satisfactorily employed.

In order that the hopper section 48 may be moved to any of the positions indicated in FIGS. 1 through 4, it is necessary that the top wall 50 of this section be spaced from the skirt 44. Such spacing would normally permit the entrance of water into the hopper section 48, as, for example, during rain storms. For this reason it is preferable to locate around the top wall 50 of the hopper section 48 a curtain 60 of flexible, waterproof material which is attached to the plate 30 in a fluid tight manner. In desert regions the curtain can be dispensed with, although even in these locations it is preferably used since it effectively prevents the entrance of other things, such as dust into the hopper section 48. In some circumstances it might be desirable to use a rigid material such as sheet metal in place of flexible curtain 60, although the flexibility is desirable to facilitate access to pins 58.

An annular flange 62 is located around the bottom outlet 54 in the hopper section 48. This flange abuts against another similar flange 64 in an inlet conduit 66 leading into the conveyor structure 16. These two flanges are preferably secured against one another in a known manner so as to form a water resistant rotary seal to prevent ingress of water. This permits the conveyor structure 16 to be moved to various positions with respect to the hopper section 14 so that the conveyor 16 may be aligned with an opening in a bin or truck or the like, as may be required. This adjustable feature increases the utility of the complete unloader to a substantial degree.

The inlet structure 66 is connected to a conventional barrel 68 containing a screw flight 70, comprising the lower end of the conveyor 16. As previously noted, any conventional conveyor structure suitable for the granular material being conveyed may be used in connection with this invention.

In order to prevent an undue build-up of the weight of the material upon the lower end of the screw flight 70, which build-up might pack the material and impede its movement, it is normally preferred to incorporate within the hopper section 48 a small, inverted generally V-shaped baffle 72. This baffle 72 is located immediately above the outlet 54 so that the material within the hopper structure 48 does not all bear directly on the inlet 54. This prevents packing of such material such as cement.

This invention is a division of my earlier filed patent application Serial No. 816,921, filed May 29, 1959, now Patent No. 3,085,674, granted April 16, 1963. The entire disclosure of that application is incorporated herein by this reference.

In view of the fact that this invention is capable of numerous modifications, it is intended that the scope of this invention be defined by the scope of the appended claims.

I claim:
1. An unloading structure which includes:
   plate means containing openings which are spaced so as to correspond to the spacing of discharge openings on a railroad car, said plate means being adapted to be located between railroad rails in the area normally occupied by a railroad tie;
   means for locating said plate means between railroad rails in the area normally occupied by a railroad tie;
   a hopper having an open top and a bottom opening, said top of said hopper being located beneath said openings in said plate means;
   and waterproofing means attached to said plate means and surrounding said top of said hopper.
2. The unloading structure of claim 1 which further includes a skirt depending from said plate, said skirt surrounding at least said openings in said plate and being within said waterproofing means attached to said plate.
3. The unloading structure of claim 2 further including means to adjustably secure said hopper to said plate in such a manner that the top of said hopper surrounds said skirt and lies within said waterproofing means.
4. The unloading structure of claim 1 further including:
   flexible waterproof connectors sealingly engageable with the discharge openings on the railroad car and with the openings in said plate means whereby material can be discharged from the railroad car into said hopper without contamination of the atmosphere.

References Cited in the file of this patent
UNITED STATES PATENTS

| | | |
|---|---|---|
| 1,230,700 | Gledhill | June 19, 1917 |
| 2,754,982 | Hoffmeister | July 17, 1956 |
| 3,085,674 | Gooding | Apr. 16, 1963 |